(12) United States Patent
Tung et al.

(10) Patent No.: US 10,793,705 B2
(45) Date of Patent: Oct. 6, 2020

(54) LATEX FORMULATION FOR MAKING ELASTOMERIC PRODUCTS

(71) Applicant: TOP GLOVE SDN. BHD., Klang, Selangor (MY)

(72) Inventors: Cian Ying Tung, Klang (MY); Keuw Wei Lim, Klang (MY); Chong Ban Wong, Klang (MY)

(73) Assignee: TOP GLOVE SDN. BHD., Klang (MY)

( * ) Notice: Subject to any disclaimer, the term of this patent is extended or adjusted under 35 U.S.C. 154(b) by 43 days.

(21) Appl. No.: 16/226,194

(22) Filed: Dec. 19, 2018

(65) Prior Publication Data

US 2019/0119474 A1 Apr. 25, 2019

Related U.S. Application Data

(63) Continuation-in-part of application No. 15/319,776, filed as application No. PCT/MY2015/050110 on Sep. 29, 2015, now Pat. No. 10,259,916.

(30) Foreign Application Priority Data

Nov. 6, 2014 (MY) .............................. PI2014003115

(51) Int. Cl.
| | |
|---|---|
| *C08L 9/04* | (2006.01) |
| *C08J 5/02* | (2006.01) |
| *C08J 3/26* | (2006.01) |
| *A41D 19/00* | (2006.01) |
| *C08K 3/22* | (2006.01) |
| *C08K 3/16* | (2006.01) |

(52) U.S. Cl.
CPC ............ *C08L 9/04* (2013.01); *A41D 19/0062* (2013.01); *C08J 3/26* (2013.01); *C08J 5/02* (2013.01); *C08K 3/16* (2013.01); *C08K 3/22* (2013.01); *A41D 2500/50* (2013.01); *C08J 2309/04* (2013.01); *C08J 2471/02* (2013.01); *C08L 2201/52* (2013.01); *C08L 2205/03* (2013.01); *C08L 2312/00* (2013.01)

(58) Field of Classification Search
CPC .. C08L 9/04; C08K 3/011; C08K 3/22; C08K 3/16; C08K 3/105; C08K 3/11; C08K 5/0025; C08J 5/02; C08J 3/26
See application file for complete search history.

(56) References Cited

U.S. PATENT DOCUMENTS

| | | |
|---|---|---|
| 2003/0017286 A1 | 1/2003 | Williams et al. |
| 2008/0227913 A1 | 6/2008 | Koide |
| 2012/0246799 A1 | 10/2012 | Khoo et al. |

OTHER PUBLICATIONS

Wikipedia "Polyethylene glycol" URL: https://www.web.archive.org/web/20131030011304/https://en.wikipedia.org/wiki/Polyethylene_glycol; Oct. 2013.
Office Action issued in U.S. Appl. No. 15/319,776 dated Sep. 28, 2018.
Office Action issued in U.S. Appl. No. 15/319,776 dated May 10, 2018.
Office Action issued in U.S. Appl. No. 15/319,776 dated Jan. 26, 2018.

*Primary Examiner* — Peter D. Mulcahy
(74) *Attorney, Agent, or Firm* — Workman Nydegger; Matthew D. Todd

(57) ABSTRACT

A latex formulation for making an elastomeric product, more particularly an elastomeric glove. The formulation comprises a mixture of at least one base polymer, a cross-linker; and a pH adjuster, where the pH adjuster provides a pH range of 9.5 to 10.5 to the latex composition. Still further, the present invention discloses a method for preparing a latex formulation for making elastomeric products, such as an elastomeric glove, without using accelerators, zinc oxide or sulphur.

18 Claims, No Drawings

LATEX FORMULATION FOR MAKING ELASTOMERIC PRODUCTS

CROSS-REFERENCE TO RELATED APPLICATIONS

The present application is a continuation-in-part of U.S. patent application Ser. No. 15/319,776, filed Dec. 17, 2016, which is a 35 U.S.C. 371 national stage application of PCT Application PCT/MY2015/050110, filed Sep. 29, 2015, which claims priority to and the benefit of Malaysia Patent Application No. PI2014003115 filed Nov. 6, 2014. Each of the foregoing applications is herein incorporated by reference in its entirety.

BACKGROUND

The Field of the Invention

The present invention relates to a formulation and method for preparing an accelerator-free elastomeric product, in particular elastomeric gloves with enhanced mechanical properties, without using zinc oxide, accelerators or sulphur.

Background of the Invention

Natural rubber is made up from multiple units of isoprene, which is a monomer unit of natural rubber. Natural rubber has a numbers of desirable properties such as elasticity, toughness, impermeability, adhesiveness, and electrical resistance that make it a highly valuable asset in a number of industries, especially in the chemical industry, as in the manufacture of adhesives, coatings, fibers, mouldings, insulators, gloves and many more.

Meanwhile, synthetic rubber is regarded as a better replacement for natural rubber, as it has a better aging period, better resistance towards chemicals and oil, a wider operating temperature range and better weathering properties. The prior art process for glove production utilizes conventional sulphur vulcanization systems that uses accelerators, such as thiurams, thiazoles and carbamates, sulphur and/or common oxides (e.g., metal oxides), such as zinc oxide.

Further, the presence of accelerators, zinc oxide and sulphur has been necessary in the manufacture of rubber products, as the accelerators, zinc oxide and sulphur act as a crosslinking agent. However, it is to be noted that the protein from natural rubber induces type I immediate hypersensitivity (allergy). Meanwhile, type IV delayed hypersensitivity (allergy) is caused by the use of commonly used accelerators such as thiurams, thiazoles and carbamates, in both natural rubber and synthetic rubber.

In order to overcome both the type I allergy and type IV hypersensitivity of contact dermatitis allergy, accelerator-free synthetic rubber gloves are needed.

U.S. Publication No. 20120246799 A1 discloses an elastomeric rubber thin film without using vulcanizing accelerators and sulphur. The elastomeric rubber thin film comprises:
  a) a carboxylated nitrile latex;
  b) a divalent oxide;
  c) a pH adjuster to obtain a pH of 9 to 10;
while the total solids content (TSC) of the film is maintained within a range from 18% to 30% by w/w, while water is used for the TSC variation.

Further, it is to be noted that the elastomeric rubber thin film in the prior art however uses zinc oxide in its composition, which is a common oxide that has a lower ionic strength. This results in weaker crosslinking that directly affects the properties of the product formed. Still further, although the elastomeric rubber thin film prepared via the above mentioned formulation is able to overcome the type I and type IV allergies, but the mechanical properties are only comparable to elastomeric rubber films produced using conventional sulphur vulcanization systems, with no improvement in terms of mechanical properties.

As such, there is a need to produce a glove using an effective latex formulation and method that will enhance the mechanical properties as well as prevent type I immediate hypersensitivity (allergy) and type IV delayed hypersensitivity (allergy).

SUMMARY

A latex formulation for making elastomeric products comprises a mixture of at least one base polymer and a cross-linker, together with a pH adjuster to provide a pH range of 9.5 to 10.5, characterized in that the cross-linker is an admixture of a) a trivalent metal or trivalent metal-based compound, wherein the trivalent metal-based compound comprises at least one of an aluminium based compound, an iron based compound or a chromium based compound; b) polyethylene glycol, where the polyethylene glycol has a molecular weight ranging from 200 Da to 200,000 Da; and c) a hydroxide salt, wherein the hydroxide salt comprises at least one of potassium hydroxide, sodium hydroxide, or ammonium hydroxide.

DETAILED DESCRIPTION

The present invention relates to a latex formulation and a method for preparing the latex formulation for making elastomeric products, such as elastomeric gloves. The gloves produced using the present invention can overcome both Type I (immediate hypersensitivity) allergy and Type IV (delayed hypersensitivity) allergy, as well as enhancing mechanical properties of the gloves.

Hereinafter, this specification will describe the present invention according to the preferred embodiments of the present invention. However, it is to be understood that limiting the description to the preferred embodiments of the invention is merely to facilitate discussion of the present invention and it is envisioned that those skilled in the art may devise various modifications and equivalents without departing from the scope of the appended claims.

A latex formulation for making an elastomeric product comprises a mixture of:
  a) at least one base polymer; and
  b) a cross-linker;
with a pH adjuster. The elastomeric product is an elastomeric glove. The latex formulation of the present invention is produced without using sulphur, without using common oxides (for instance zinc oxide) and without using accelerators. The commonly used accelerators in the glove industries are thiurams, thiazoles and carbamates. The latex formulation of the present invention uses a cross-linker which cross-linker composition is an admixture of a trivalent metal or trivalent metal-based compound, polyethylene glycol, a hydroxide salt, and water.

The base polymer used in said latex formulation is synthetic latex. The synthetic latex can comprise at least one of polyisoprene, carboxylated polyacrylonitrile butadiene, or neoprene. The preferred base polymer in the present invention is a base polymer with a carboxylated group, such as carboxylated polyacrylonitrile butadiene. In an embodiment, the base polymer may not be treated to introduce a quaternary ammonium or other cationizing agent into the latex (e.g., in contrast to US 2008/0227913 to Koide).

Meanwhile, use of the pH adjuster in said latex formulation is to retain said latex formulation in a stable condition, which is provided by providing a suitable pH range. The preferred pH range that will keep said latex formulation in a stable condition is between 9.5 to 10.5. The pH adjuster may comprise one or more of potassium hydroxide, sodium hydroxide, or ammonia, preferably ammonia.

The cross-linker formulation as mentioned above is an admixture of a trivalent metal or trivalent metal-based compound, polyethylene glycol, a hydroxide salt, and water, wherein the trivalent metal comprises at least one of aluminium, iron or chromium. Meanwhile, the trivalent metal-based compound comprises at least one of an aluminium based compound, an iron (III) based compound or a chromium (III) based compound, preferably an aluminium based compound. The aluminium based compound may comprise at least one of aluminium oxide, aluminium sulphate, aluminium chloride, aluminium hydroxide, aluminium phosphate, or sodium aluminate. The trivalent metal or trivalent metal based-compound used for the cross-linker formulation may be aluminium hydroxide.

Use of the trivalent metal or trivalent metal based compound in the cross-linker formulation eliminates the need for sulphur, accelerators and common metal oxides (for instance zinc oxide). Furthermore, the trivalent metals or trivalent metal compounds may be inorganic, as indicated above, rather than an organometallic compound (e.g., in contrast to US 2008/0227913 to Koide). For example, the inorganic trivalent metal compound may include no carbon. Use of the systems and components described herein provide excellent strength properties, as well as elimination of type I and type IV allergies.

Another important feature of the cross-linker formulation is the use of polyethylene glycol, which functions as a chain extender. The polyethylene glycol forms a complex compound with the trivalent metal or trivalent metal-based compound. The complex compound is a result of reaction between the trivalent metal or trivalent metal-based compound and polyethylene glycol. The optimal cross-linkages between the complex and the latex polymer chain enhance the mechanical properties of the latex formulation. As a result of the cross-linkages, a glove with enhanced strength is produced, as depicted by Table 2 to Table 8.

Polyethylene glycol having molecular weight ranging in between 200 Da to 200,000 Da is used as a chain extender. The hydroxide salt used in the cross-linker formulation may comprise at least one of potassium hydroxide, sodium hydroxide, or ammonium hydroxide. The preferred hydroxide salt used in the cross-linker formulation is sodium hydroxide.

A second aspect of the present invention relates to a method for preparing said cross-linker formulation, which method comprises the steps of:
 i. dissolving at least one trivalent metal or trivalent metal-based compound in an aqueous hydroxide salt;
 ii. stirring the mixture obtained from step (i) at a temperature ranging from 40° C. to 80° C.; and
 iii. adding polyethylene glycol to the solution obtained from step (ii) to produce the cross-linker.

The cross-linker contains 1% to 20%, preferably 3% by weight of the trivalent metal or trivalent metal-based compound. The cross-linker contains 1% to 10% by weight of the hydroxide salt. The cross-linker contains 10% to 30%, preferably 20% by weight of polyethylene glycol. The remainder of the cross-linker may be water.

Optionally, additives can also be added to the latex formulation, such as one or more of antifoams, waxes, surfactants, antioxidants, stabilizers, fillers, or pigments. The prepared cross-linker is then dissolved in a 40% to 60% concentration of aqueous hydroxide salt before adding to a mixture comprising the base polymer and pH adjuster for preparing the above mentioned latex formulation.

A method for preparing the latex formulation for making an elastomeric product without using accelerators and without using sulphur comprises the steps of:
 i. mixing a base polymer with a pH adjuster, wherein the mixture has 0.15 phr to 0.50 phr of the pH adjuster per hundred grams of the base polymer;
 ii. stirring the mixture obtained from step (i) for a time period ranging from 20 minutes to 30 minutes;
 iii. adding a cross-linker prepared as discussed above to the mixture obtained from step (ii), wherein the mixture has 0.5% to 10%, preferably 1.5% to 6.0% of the cross-linker per hundred grams of the base polymer;
 iv. stirring the mixture obtained from step (iii) for an hour;
 v. adding water to the mixture obtained from step (iv) to achieve a total solids content ranging from 13% to 30% by w/w; and
 vi. allowing the mixture obtained in step (v) to mature for 20 hours to 30 hours.

The pH range of the mixture after step (vi) is maintained between 9.5 to 10.5, wherein the cross-linker is an admixture of a trivalent metal or trivalent metal-based compound, polyethylene glycol, a hydroxide salt and water.

Further, the method for preparing a latex formulation preferably includes a step of adding one or more additive(s) such as antifoams, waxes, surfactants, antioxidants, stabilizers, fillers, pigments or mixtures thereof to the mixture obtained from step (iv).

Further, the elastomeric product prepared is an elastomeric glove. The method of manufacturing elastomeric gloves using said latex formulation prepared as disclosed above may use methods commonly known in the glove manufacturing industry. The elastomeric glove prepared may have a thickness ranging between 0.04 mm to 0.12 mm, a tensile strength ranging between 25 MPa to 40 MPa, a 500% modulus of 7 MPa to 12 MPa and an elongation at break ranging from 600% to 750%.

Apart from that, the elastomeric product using the above mentioned latex formulation can also be extended for preparing condoms, balloons and any other dipped latex product.

The following examples are constructed to illustrate the present invention in a non-limiting sense.

Example 1

Preparation of Cross-Linker:
 i. dissolving 3% by w/w of aluminium hydroxide in aqueous sodium hydroxide solution;
 ii. stirring the mixture of aluminium hydroxide and aqueous sodium hydroxide obtained in step (i) at a temperature ranging from 40° C. to 80° C.; and
 iii. adding 20% by w/w of polyethylene glycol to the solution obtained from step (ii) to produce the cross-linker, wherein the prepared cross-linker is then dissolved in a 40% to 60% concentration of aqueous hydroxide salt before using it in the preparation of the latex formulation.

Example 2

Preparation of the Latex Formulation:
i. mixing carboxylated polyacrylonitrile butadiene with ammonia, wherein the mixture has 0.30 phr of the ammonia per hundred grams of the base polymer;
ii. stirring the mixture obtained from step (i) for a time period ranging from 20 minutes to 30 minutes;
iii. adding 6.0% of the cross-linker per hundred grams of the base polymer obtained from example 1 into the mixture obtained in step (ii);
iv. stirring the mixture obtained from step (iii) for about an hour;
v. adding water to the mixture obtained from step (iv) to achieve a total solids content from 13% to 30% by w/w; and
vi. allowing the resulting mixture obtained from step (v) to mature for 20 hours to 30 hours for the formation of carboxylated polyacrylonitrile butadiene (NBR) latex formulation, wherein the pH range of the mixture after step (vi) is maintained between 9.5 to 10.5, wherein the cross-linker is an admixture of an aluminium hydroxide, polyethylene glycol and aqueous sodium hydroxide, and optionally, adding antifoam, wax, surfactant, antioxidant and pigment to the mixture obtained from step (iv).

Table 1 shows the chemical components used in this example to produce said latex formulation.

TABLE 1

Chemical components used to produce said latex formulation

| Chemicals | Parts per hundred rubber (phr) |
| --- | --- |
| Carboxylated polyacrylonitrile butadiene latex | 100.0 |
| Ammonia | 0.3 |
| Cross-linker | 2.0 |

Example 3

Manufacturing carboxylated polyacrylonitrile butadiene (NBR) gloves using said latex formulation as prepared in example 2 using methods commonly known in the glove manufacturing industry.

Mechanical properties (i.e. tensile strength, modulus at 300%, modulus at 500% and elongation at break) of the prepared NBR glove are tested according to standard method ASTM D6319. Table 2 shows the mechanical properties of the NBR glove prepared using different types of inorganic aluminium-based compounds.

TABLE 2

Mechanical properties of the NBR glove using different type of Aluminium-based compounds

| Type of Aluminum Salt | Tensile Strength (MPa) | Elongation at Break (%) | Modulus at 500% (MPa) |
| --- | --- | --- | --- |
| Aluminium Hydroxide | 31.0-46.0 | 581.0-654.0 | 14.0-22.0 |
| Aluminium Chloride | 33.0-42.0 | 511.0-573.0 | 23.0-33.0 |
| Aluminium Sulphate | 16.0-27.0 | 592.0-648.0 | 10.0-13.0 |
| Sodium Aluminate | 28.0-35.0 | 578.0-608.0 | 17.0-21.0 |
| Control | 28.0-33.0 | 625.0-661.0 | 11.0-15.0 |

The other mechanical property (i.e. force at break) of the prepared NBR glove is also tested according to standard method EN455. The mechanical property (force at break) of the NBR glove prepared using different types of aluminium-based compounds is shown in Table 3.

TABLE 3

Force at break of the NBR glove using different types of Aluminium-based compounds

| Type of Aluminium Salt | Force at Break (N) |
| --- | --- |
| Aluminium Hydroxide | 6.1-8.0 |
| Aluminium Chloride | 6.5-7.6 |
| Aluminium Sulphate | 4.0-5.5 |
| Sodium Aluminate | 5.4-6.7 |
| Control | 4.7-6.1 |

Further, Table 4 to Table 7 show mechanical properties (i.e. tensile strength, modulus at 300%, modulus at 500%, elongation at break and force at break) of the NBR glove using different types of inorganic trivalent metals.

TABLE 4

Tensile strength of the NBR glove using different types of trivalent metals

| Set | Control | Chromium (III) | Iron (III) | Aluminium |
| --- | --- | --- | --- | --- |
| Before Aging Tensile (MPa) | 27.0-35.0 | 10.0-14.0 | 11.0-16.0 | 37.0-45.0 |
| After Aging Tensile (MPa) | 31.0-46.0 | 11.0-22.0 | 10.0-16.0 | 32.0-40.0 |

TABLE 5

Elongation of the NBR glove using different types of trivalent metals

| Set | Control | Chromium (III) | Iron (III) | Aluminium |
| --- | --- | --- | --- | --- |
| Before Aging Elongation (%) | 575.0-613.0 | 741.0-795.0 | 737.0-786.0 | 617.0-654.0 |
| After Aging Elongation (%) | 502.0-535.0 | 699.0-787.0 | 736.0-804.0 | 589.0-628.0 |

TABLE 6

Modulus at 500% of the NBR glove using different types of trivalent metals

| Set | Control | Chromium (III) | Iron (III) | Aluminium |
| --- | --- | --- | --- | --- |
| Before Aging Modulus at 500% (MPa) | 13.0-18.0 | 2.3-2.7 | 2.5-2.9 | 14.0-22.0 |
| After Aging Modulus at 500% (MPa) | 30.0-38.0 | 2.8-3.2 | 2.6-3.1 | 15.0-21.0 |

TABLE 7

Force at break of the NBR glove using different types of trivalent metals

| Set | Control | Chromium (III) | Iron (III) | Aluminium |
|---|---|---|---|---|
| Before Aging Force at Break (N) | 5.9-7.0 | 3.1-4.2 | 3.1-3.9 | 6.1-8.0 |
| After Aging Force at Break (N) | 7.2-9.4 | 4.1-5.1 | 2.5-4.9 | 6.2-8.9 |

In addition, Table 8 shows the comparison of physical and mechanical properties of the NBR glove prepared using the present invention as compared to gloves prepared using prior art accelerator-free vulcanization systems.

TABLE 8

Physical and mechanical properties of the NBR glove of the present invention and the prior art

| Set | Prior Art | Prior Art | Present Invention | Present Invention |
|---|---|---|---|---|
| Thickness (mm) | 0.08-0.09 | 0.07-0.08 | 0.06-0.07 | 0.07-0.08 |
| Tensile Strength (MPa) | 20-31 | 20-22 | 31-41 | 26-34 |
| Elongation at Break (%) | 585-620 | 580-620 | 574-623 | 611-666 |
| Modulus at 300% (MPa) | Not stated | Not Stated | 4.5-6.4 | 5.3-6.0 |
| Modulus at 500% (MPa) | 9.1-10 | 6.0-6.5 | 14.4-21.3 | 13.7-16.8 |

The mechanical properties like tensile strength, elongation at break, and modulus at 500% of the glove prepared using the present invention results in enhanced values as compared to the gloves prepared using other accelerator-free vulcanization systems.

As a whole, the glove prepared using the present invention gives better and/or enhanced mechanical properties as compared to gloves prepared using other accelerator-free systems. Further, the glove prepared based on the present invention is free from type I immediate hypersensitivity (allergy) and type IV delayed hypersensitivity (allergy).

Further Compositional Characterizations

The examples and description above provide component fractions (Parts) as noted below in Table 9. Calculated weight fractions of each component of the latex composition as a whole are further calculated from these data, reported in Table 9 below, further characterizing the latex composition. Such fractions are calculated excluding any water content (as the water is typically driven off during manufacture as will be appreciated by those of skill in the art).

TABLE 9

Compositional Characteristics

| Chemicals | Parts | Wt. Fraction |
|---|---|---|
| Base Polymer | 100.0 | 94%-98% |
| pH adjuster | 0.15-0.5 | 0.15%-0.5% |
| Cross-linker | 1.5-6 | 1.5%-5.6% |
| Total | 101.65-106.5 | 100% |

The calculations for Table 9 are as follows:
Calculations
i) Base polymer
100/101.65=98%
100/106.5=94%
ii) pH adjuster
0.15/101.65=0.15%
0.5/106.5=0.5%
iii) Cross-linker
1.5/101.65=1.5%
6/106.5=5.6%

The cross-linker itself is also described above as including 1% to 20% by weight of the trivalent metal or trivalent metal compound, 10% to 30% by weight of the polyethylene glycol, and 1% to 10% by weight of the hydroxide salt, with the balance being water (which is neglected in the calculations). Table 10 shows compositional characteristics for these components of the cross-linker component, in the latex formulation as a whole, based on the above percentages.

TABLE 10

More Detailed Compositional Characteristics

| Chemicals | Wt. Fraction |
|---|---|
| Trivalent Metal/Trivalent Metal Compound | 0.015%-1.12% |
| Polyethylene Glycol | 0.15%-1.68% |
| Hydroxide Salt | 0.015%-0.56% |

The calculations for Table 10 are as follows:
Calculations
i) Trivalent Metal/Trivalent Metal Compound (1% to 20% of cross-linker)
1%×1.5 of cross-linker=0.015%
20%×5.6 of cross-linker=1.12%
ii) Polyethylene Glycol (10% to 30% of cross-linker)
10%×1.5 of cross-linker=0.15%
30%×5.6 of cross-linker=1.68%
iii) Hydroxide Salt (1% to 10% of cross-linker)
1%×1.5 of cross-linker=0.015%
10%×5.6 of cross-linker=0.56%

Combining these calculated percentages together, the overall latex composition, neglecting any water content, would then have compositional fractions as shown below in Table 11.

TABLE 11

Overall Compositional Characteristics

| Chemicals | Wt. Fraction |
|---|---|
| Base Polymer | 94%-98% |
| pH adjuster | 0.15%-0.5% |
| Trivalent Metal/Trivalent Metal Compound | 0.015%-1.12% |
| Polyethylene Glycol | 0.15%-1.68% |
| Hydroxide Salt | 0.015%-0.56% |

Further details of embodiments according to the present invention are provided below in Tables 12-13.

TABLE 12

Formulation-Present Invention

| Chemical Name | phr (Range) |
|---|---|
| Carboxylated polyacrylonitrile butadiene latex | 100 |
| pH adjuster | 0.15-0.50 |
| Cross-linker | 0.5-10 |
| Opacity modifier | 0-2 |

TABLE 12-continued

| Formulation-Present Invention | |
|---|---|
| Chemical Name | phr (Range) |
| Wax | 0-1 |
| Colour Pigment | 0-2 |
| Antifoam | 0-0.01 |
| Filler | 0-5 |

Details of chemical properties in the coagulant tank, latex dipping tank and the chlorine tank used, which process steps and structures will be familiar to those of skill in the art, are shown below in Table 13.

TABLE 13

| Tank Properties | | |
|---|---|---|
| Chemical | Chemical Properties | Process Range |
| Coagulant tank | CN % | 8-20, preferably 11-16 |
|  | Foaming height (cm) | 0.5-3.0 |
|  | PF coagulant | 0.8-2.5 |
|  | pH | 9-11 |
| Latex dipping tank 1 | TSC (%) | 8-30, preferably 8-20 |
|  | pH | 9.5-11 |
| Latex dipping tank 2 | TSC (%) | 8-30, preferably 8-20 |
|  | pH | 9.5-11 |
| Chlorine | Chlorine (ppm) | 500-900 |

Table 14 presents a comparative prior art formulation, including an accelerator.

TABLE 14

| Formulation-Comparative Example | |
|---|---|
| Chemical Name | phr (Range) |
| Carboxylated polyacrylonitrile butadiene latex | 100 |
| pH adjuster 1 | 0-2 |
| pH adjuster 2 | 0-2 |
| Curing agent 1 | 0-2 |
| Accelerator | 0-1.5 |
| Curing agent 2 | 0-2 |
| Colour Pigment | 0-2 |
| Opacity modifier | 0-2 |
| Antifoam | 0-0.1 |
| Stabilizer | 0-2 |
| Dispersing agent | 0-1 |

Further operating parameters are further described in Table 15.

TABLE 15

| Further Operating Parameters | | | | | | |
|---|---|---|---|---|---|---|
| | | Process values | | | | |
| Parameters | | Comp. Ex. 1 (Thickness: 0.08 to 0.09) | Comp. Ex. 2 (Thickness: 0.07 to 0.08) | Present invention 1 (Thickness: 0.06 to 0.07) | Present invention 2 (Thickness: 0.07 to 0.08) | Process (Range) |
| Main oven Z1 | Temp (° C.) | 120 | 120 | 120 | 120 | 90-130 |
| Main oven Z2 | Temp (° C.) | 121 | 121 | 121 | 121 | 90-130 |
| Main oven Z3 | Temp (° C.) | 126 | 126 | 126 | 126 | 90-130 |
| Main oven Z4 | Temp (° C.) | 119 | 119 | 119 | 119 | 90-130 |
| Final drying oven | Temp (° C.) | 82 | 82 | 82 | 82 | 110-160 |
| Coagulant oven | Temp (° C.) | 146 | 146 | 146 | 146 | 100-200 |
| Latex oven | Temp (° C.) | 126 | 126 | 126 | 126 | 50-150 |
| Acid tank | Temp (° C.) | 59 | 59 | 59 | 59 | 40-70 |
| Alkaline tank | Temp (° C.) | 57 | 57 | 57 | 57 | 40-70 |
| Coagulant tank | Temp (° C.) | 53 | 53 | 53 | 53 | 50-60 |
| Latex tank 1 | Temp (° C.) | 40 | 40 | 40 | 40 | 35-40 |
| Dwell time in latex tank 1 | Seconds (s) | 8 | 7 | 5 | 7 | 4-8 |
| Former temperature before latex tank 1 (° C.) | Temp (° C.) | 73 | 73 | 73 | 73 | 60-80 |
| Latex tank 2 | Temp (° C.) | 33 | 33 | 33 | 33 | 35-40 |

TABLE 15-continued

Further Operating Parameters

| Parameters | | Comp. Ex. 1 (Thickness: 0.08 to 0.09) | Comp. Ex. 2 (Thickness: 0.07 to 0.08) | Present invention 1 (Thickness: 0.06 to 0.07) | Present invention 2 (Thickness: 0.07 to 0.08) | Process (Range) |
|---|---|---|---|---|---|---|
| Dwell time in latex tank 2 | Seconds (s) | 8 | 7 | 5 | 7 | 4-8 |
| Pre leaching tank 1 | Temp (° C.) | 59 | 59 | 59 | 59 | 45-70 |
| Pre leaching tank 2 | Temp (° C.) | 59 | 59 | 59 | 59 | 40-70 |
| Pre leaching tank 3 | Temp (° C.) | 50 | 50 | 50 | 50 | 40-70 |

Minor differences in dwell time noted above affect the glove's thickness. Otherwise, the operating parameters are substantially the same in preparing a glove. The improved results are attributed to the differences in the latex composition used in forming gloves and other elastomeric products according to the present invention.

The invention claimed is:

1. A latex formulation for making an elastomeric product, comprising a mixture of:
   a) a base polymer; and
   b) a cross-linker;
      wherein the cross-linker is an admixture of:
         a) an inorganic trivalent metal or inorganic trivalent metal-based compound;
         b) polyethylene glycol having a molecular weight ranging from about 200 Da to about 200,000 Da; and
         c) a hydroxide salt, wherein the hydroxide salt comprises at least one of potassium hydroxide, sodium hydroxide, or ammonium hydroxide;
      wherein the cross-linker is included in the latex formulation in an amount of from about 1.5% to about 6% per hundred grams of the base polymer (phr), wherein the latex formulation includes 0.015 to 0.18 phr of the inorganic trivalent metal or trivalent metal-based compound, 0.3 to 1.8 phr of the polyethylene glycol, and 0.015 to 0.6 phr of the hydroxide salt; and
      wherein the latex formulation has a pH from 9.5 to 10.5.

2. The latex formulation as recited in claim 1 wherein the elastomeric product is an elastomeric glove.

3. The latex formulation as recited in claim 1 wherein the base polymer is synthetic latex.

4. The latex formulation as claimed in claim 3 wherein the synthetic latex comprises at least one of carboxylated polyacrylonitrile butadiene, neoprene, or polyisoprene.

5. The latex formulation as recited in claim 4 wherein the synthetic latex comprises carboxylated polyacrylonitrile butadiene.

6. The latex formulation as recited in claim 1 wherein the inorganic trivalent metal comprises at least one of aluminium, iron, or chromium.

7. The latex formulation as recited in claim 1 wherein the inorganic trivalent metal-based compound comprises at least one of an aluminium based inorganic compound, an iron (III) based inorganic compound, or a chromium (III) based inorganic compound.

8. The latex formulation as recited in claim 1 wherein the inorganic trivalent metal-based compound comprises at least one of aluminium oxide, aluminium sulphate, aluminium chloride, aluminium hydroxide, aluminium phosphate, or sodium aluminate.

9. The latex formulation as recited in claim 1 wherein the inorganic trivalent metal-based compound comprises $Al(OH)_3$.

10. The latex formulation as recited in claim 1 wherein the cross-linker contains about 3% by weight of the inorganic trivalent metal or inorganic trivalent metal-based compound.

11. The latex formulation as recited in claim 1 wherein the hydroxide salt comprises sodium hydroxide.

12. The latex formulation as recited in claim 1, further comprising a pH adjuster, wherein the pH adjuster comprises at least one of sodium hydroxide, potassium hydroxide, or ammonia.

13. The latex formulation as recited in claim 12 wherein the pH adjuster comprises ammonia.

14. The latex formulation as recited in claim 1 wherein the latex formulation further includes one or more additives selected from the group consisting of antifoams, waxes, surfactants, antioxidants, stabilizers, fillers, or pigments.

15. An elastomeric glove formed from the latex formulation of claim 1, wherein the elastomeric glove has a tensile strength ranging from 25 MPa to 40 MPa, a 500% modulus of at least 7 MPa, and an elongation at break ranging from 600% to 750%.

16. A latex formulation for making an elastomeric product, comprising a mixture of:
   a) a base polymer; and
   b) a cross-linker;
      wherein the cross-linker is an admixture of:
         a) an inorganic trivalent metal-based compound, the inorganic trivalent metal-based compound consisting of $Al(OH)_3$;
         b) polyethylene glycol having a molecular weight ranging from about 200 Da to about 200,000 Da; and
         c) another hydroxide salt, wherein the other hydroxide salt comprises at least one of potassium hydroxide, sodium hydroxide, or ammonium hydroxide;

wherein the cross-linker is included in the latex formulation in an amount of from about 1.5% to about 6% per hundred grams of the base polymer (phr), wherein the latex formulation includes 0.015 to 0.18 phr of the $Al(OH)_3$, 0.45 to 1.8 phr of the polyethylene glycol, and 0.015 to 0.6 phr of the other hydroxide salt; and wherein the latex formulation has a pH from 9.5 to 10.5.

17. A latex formulation for making an elastomeric product, the latex formulation consisting of a mixture of:
   a) a base polymer; and
   b) a cross-linker;
      wherein the cross-linker is an admixture of:
         a) aluminium hydroxide;
         b) polyethylene glycol having a molecular weight ranging from about 200 Da to about 200,000 Da; and
         c) another hydroxide salt, wherein the hydroxide salt is selected from the group consisting of potassium hydroxide, sodium hydroxide, ammonium hydroxide, and mixtures thereof;
      wherein the cross-linker is included in the latex formulation in an amount of from about 1.5% to about 6% per hundred grams of the base polymer (phr), wherein the latex formulation includes 0.015 to 0.18 phr of the aluminum hydroxide, 0.3 to 1.8 phr of the polyethylene glycol, and 0.015 to 0.6 phr of the other hydroxide salt;
      wherein the latex formulation has a pH from 9.5 to 10.5;
      wherein the balance of the formulation consists of water; and
      optionally, one or more additives selected from the group consisting of pH adjusters, antifoams, waxes, surfactants, antioxidants, stabilizers, fillers, and pigments.

18. The latex formulation as recited in claim 17 wherein the latex formulation has a total solids content of from 13% to 30% by weight, the balance consisting of the water.

* * * * *